April 10, 1962 H. W. CRESSWELL 3,028,872
PLASTIC GREENHOUSES

Filed June 17, 1959 2 Sheets-Sheet 1

INVENTOR
H. W. CRESSWELL

BY Irvin S. Thompson

ATTORNEY

April 10, 1962 H. W. CRESSWELL 3,028,872
PLASTIC GREENHOUSES

Filed June 17, 1959 2 Sheets-Sheet 2

INVENTOR
H. W. CRESSWELL

BY Irwin S. Thompson

ATTORNEY

United States Patent Office 3,028,872
Patented Apr. 10, 1962

3,028,872
PLASTIC GREENHOUSES
Harold William Cresswell, % Treona Nurseries,
Staunton, near Gloucester, England
Filed June 17, 1959, Ser. No. 820,939
Claims priority, application Great Britain June 21, 1958
5 Claims. (Cl. 135—14)

This invention relates to greenhouses and has for its primary object to provide a ventilated greenhouse of lightweight construction which is readily transportable by hand labour. A further object is to provide a ventilated greenhouse of great versatility which can be added to in order to increase its area as desired.

According to the invention, a greenhouse of substantially arcuate shape in cross-section and having a body comprising a main framework covered with flexible transparent sheet material is provided with ventilating means comprising at least one ventilating panel having a resilient frame covered with flexible transparent sheet material, one part of the frame being secured between adjacent portions of the main framework so that another part of the frame, due to the natural resilience of the frame, tends to take up a position outwardly of the arcuate shape of said adjacent portions thus providing a ventilating opening between said portions, and retaining means to control the position of said other part and operable to bend the frame to said arcuate shape to close the ventilating opening.

The flexible transparent sheet material may be polyvinyl chloride, polyethylene or other suitable transparent material.

Figure 1:
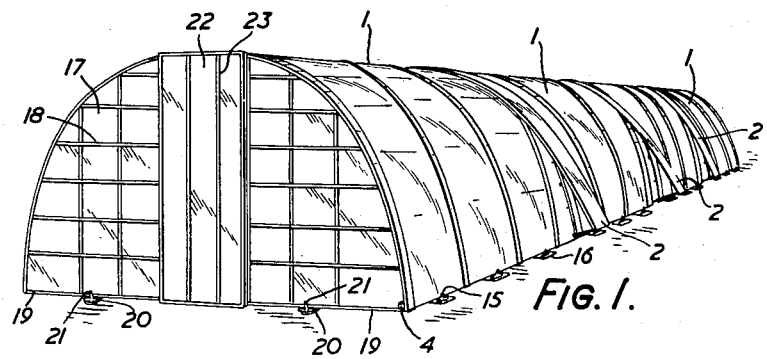
Figure 2:
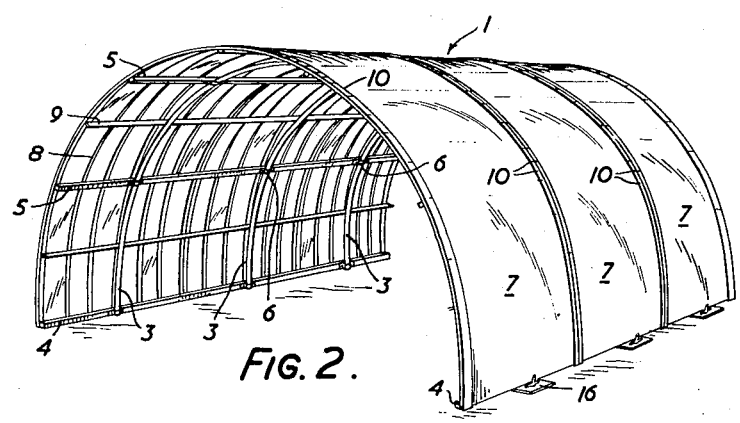
Figure 3:
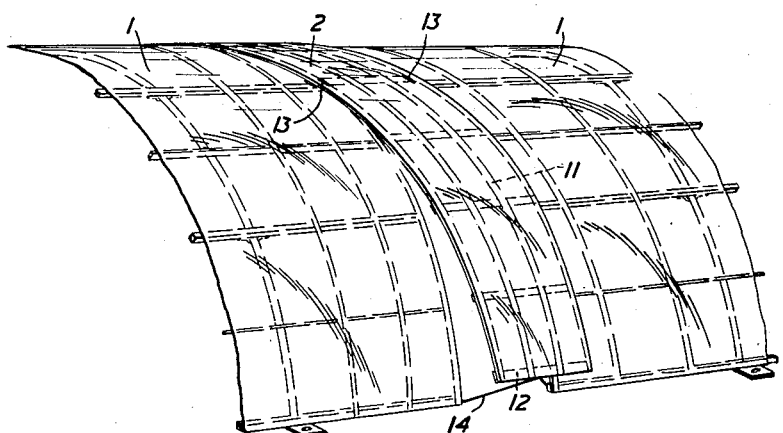
Figure 4:
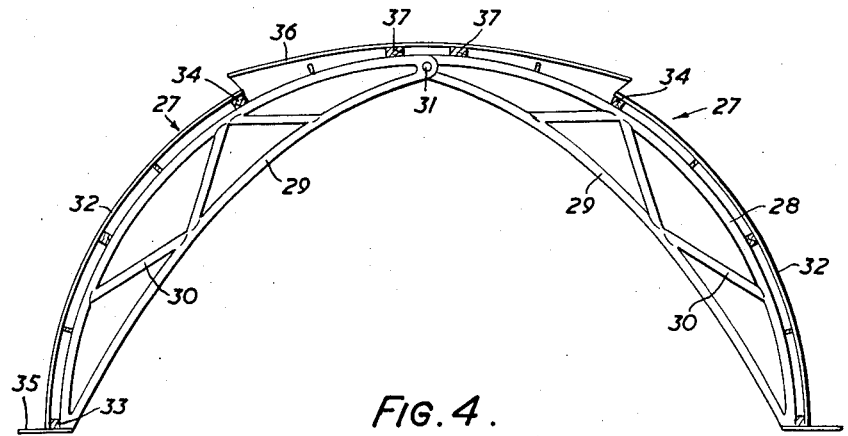
Figure 5:
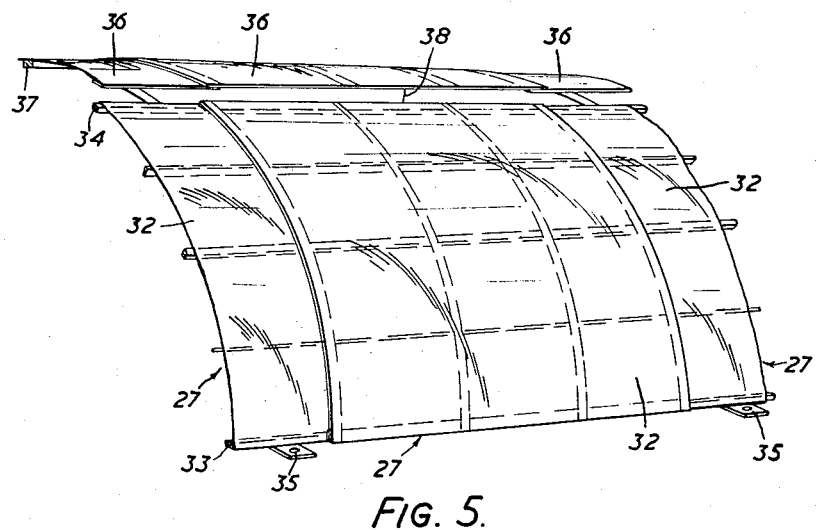

The invention will now be further described with reference to the accompanying drawings which illustrate several embodiments of the invention by way of example, and in which:

FIGURE 1 is a perspective view of a greenhouse in accordance with the invention, FIGURE 2 is a similar but more detailed view of one section of the greenhouse, FIGURE 3 is a detail view of the ventilating arrangements of the greenhouse, FIGURE 4 is a lateral cross-sectional view of a further construction of greenhouse section in accordance with the invention, and FIGURE 5 is a detail view of the ventilating arrangements of the greenhouse of FIGURE 4.

In the constructional form of greenhouse illustrated in FIGURES 1 to 3, the body portion comprises several identical sections 1 and intervening ventilator panels 2 placed end to end to provide a house of elongated form and of arcuate shape, or substantially in the form of a major segment of a circle, in cross-section, i.e. somewhat in the form of a Nissen hut.

Each section 1 comprises a main frame-work of three spaced members 3 which form tubular steel ribs extending from a longitudinal rigid ground bar 4, along one lower edge of the body, upwardly, over and downwardly to a similar ground bar 4 on the other side of the body to form the aforesaid arcuate shape. Four spaced longitudinal elements 5 of the framework are fixed to the outside of the members 3 by saddles such as 6, and three abutting panels 7 are fixed to the framework so formed. Each of these panels 7 comprises a subsidiary framework of a semi-rigid character, comprising for example thin wooden laths, forming both subsidiary ribs such as 8, and further longitudinal elements such as 9.

Each panel 7 is formed in the flat and has flexible transparent sheet plastic material attached to its outer surface and after attaching this material the panel is bent round and attached to the main framework 3, 4, 5. This plastic material is applied to the panel subsidiary framework in strip form, being cut from rolls into lengths sufficient to reach from one ground bar 4, over and downwardly to the other ground bar 4. The plastic strip is secured to the framework along its edges only, which are tacked respectively to the two outer ribs 8 of the corresponding panel with the aid of light plastic capping strips or battens 10 which are placed over the outer ribs 8 with the plastic material sandwiched therebetween. As shown in FIGURE 2, the plastic sheet of adjacent panels 7 overlaps and pairs of strips 10 are fixed after the panels are fixed to the main framework and bridges the gap between them.

The intermediate longitudinal elements 9 of each subsidiary framework are so positioned that, when the panel is fixed to the main framework, they lie midway between adjacent main longitudinal elements 5 or the lower elements 5 and the corresponding ground bars 4.

As a result of the semi-rigid character of the subsidiary frameworks the panels 7 take up the required arcuate shape due to passing over and attachment to the members of the main framework.

The complete sections 1 are approximately 15 feet in length, each panel 7 being covered with sheet plastic material cut from a roll having a standard width of 5 feet. The ground bars 4 and the main longitudinal elements 5 finish at the ends of each section 1 which is a complete unit in itself, and can be closed by flat end panels. However, in the arrangement of FIGURE 1 four sections 1 are placed substantially end to end with three interposed ventilator panels 2 to form a house of considerable length. These ventilator panels are relatively short, being about 2 feet 6 inches in length, and in their closed position are of the same arcuate shape as the adjoining sections 1 of the body portion. The panels 2 are completely separate from the sections 1 and are of the same general construction, having longitudinal rails 11 and ground bars 12, the latter being of somewhat lighter weight than the ground bars 4. The ventilator panels 2 are fixed to the upper longitudinal elements 5 of the framework of the adjoining sections 1 by wire clips 13 and achieve ventilation by springing outwardly due to the natural resilience of their construction when cords 14 are released which are attached to the lower portions of the panels 2 and held by stakes fixed in the ground inside the house.

The sections 1 of the body portion of the house are held against being blown away by high winds by headed metal stakes such as 15, see FIGURE 1, driven through holes in metal plates 16 welded to the lower ends of the tubular members 3 and projecting outwardly beneath the ground bars 4. There are thus three plates 16 along each ground bar 4 of the 15 foot sections 1.

At each end the body portion of the house is closed by a flat removable end panel 17. These panels also comprise strips of flexible transparent sheet plastic material laid upon cross-framing 18 of wood with overlying battens as already described in connection with the sections 1. They also have ground bars 19 each of which has two eyes 20 for the reception of headed stakes 21. At least one of the end panels 17, as shown in FIGURE 1, is provided with a central door 22 which is also of sheet plastic material laid upon wooden cross-framing 23. The door 22 is hinged at its upper end about a horizontal axis so that it may be lifted in a flap-like manner to obtain entry into the house. The hinges of the door 22 are so constructed that it can be unhooked and removed to leave the doorway completely unobstructed.

The greenhouse section illustrated in FIGURE 5 is intended for a house which spans a ground area of greater width than the house already described, and for ease of portability each section is split along its centre line to provide two sub-sections 27. The main framework of each sub-section 27 has main ribs 28 which fulfil the same purpose as the ribs 3 of the arrangement already described and for their proper support are each provided with a truss comprising a further tubular member 29 and intervening tubular struts 30. The adjacent trusses of the corresponding sub-sections overlap and are connected together by removable metal pins 31 to provide a complete arcuate section.

Each sub-section 27 has three panels 32 which correspond generally to the panels 7 but only extend from the ground bars 33 to the level of upper main longitudinal elements 34 of the main framework. When assembled, as shown in FIGURE 5, adjacent sections overlap to prevent the entry of rain. As in the earlier arrangement, the ribs 28 are welded to projecting metal plates 35 through which headed metal stakes can be driven into the ground.

After each section has been assembled, a ventilator panel 36 is fixed to the two uppermost main longitudinal elements 37, and when the complete house is assembled the ventilator panels 36 of adjacent sections overlap to prevent the entry of rain. These ventilation arrangements, which can also readily be adapted for use with a greenhouse constructed generally in the manner previously described, provide top ventilation of the house rather than side ventilation as with the arrangements already described.

The ventilator panels 36 operate in a similar manner to the panels 2. Thus, they achieve ventilation by springing outwardly, due to the natural resilience of their construction, against the restraining influence of adjustment cords 38 attached at their outer ends to the panels 36 and at their inner ends to the panels 32.

I claim:

1. Ventilating means for a greenhouse of substantially arcuate shape in cross-section having a body comprising a main framework covered with flexible transparent sheet material, the ventilating means comprising at least one ventilating panel having a resilient frame covered with flexible transparent sheet material, one part of the frame being secured between adjacent portions of the main framework so that another part of the frame, due to the natural resilience of the frame, tends to take up a position outwardly of the arcuate shape of said adjacent portions thus providing a ventilating opening between said portions, and retaining means to control the position of said other part and operable to bend the frame to said arcuate shape to close the ventilating opening.

2. Ventilating means according to claim 1, wherein the body comprises a plurality of sections placed substantially end to end so that at least two sections communicate with each other and form a substantially continuous whole, and wherein the ventilating panel extends, when closed, around the full arcuate shape of the house and is interposed between two adjacent sections.

3. Ventilating means according to claim 2, wherein the ventilating panel is narrower than one of the sections in a longitudinal direction.

4. Ventilating means according to claim 1, wherein the ventilating panel only extends over the upper region of the body.

5. Ventilating means for a greenhouse of substantially arcuate shape in cross-section having a body comprising a main framework covered with flexible transparent sheet material, the ventilating means comprising at least one ventilating panel having a resilient frame covered with flexible transparent sheet material, one part of the frame being secured between adjacent portions of the main framework so that another part of the frame, due to the natural resilience of the frame, tends to take up a position outwardly of the arcuate shape of said adjacent portions thus providing a ventilating opening between said portions, and retaining means to control the position of said other part and operable to bend the frame to said arcuate shape to close the ventilating opening, and wherein the ventilating panel is of such a width that the edges thereof overlie the adjacent portions of the main framework when the ventilating opening is closed.

References Cited in the file of this patent

UNITED STATES PATENTS

| | | |
|---|---|---|
| 2,797,696 | Fritsche | July 2, 1957 |
| 2,823,683 | Smith et al. | Feb. 18, 1958 |
| 2,828,756 | Worley | Apr. 1, 1958 |
| 2,869,561 | Harkness | Jan. 20, 1959 |